July 9, 1957  J. A. MARTELL  2,798,443
MULTILAYER TABLET COMPRESSING MACHINE
Filed July 21, 1954  3 Sheets-Sheet 1

INVENTOR.
JACK A. MARTELL
BY
ATTORNEYS

July 9, 1957 — J. A. MARTELL — 2,798,443
MULTILAYER TABLET COMPRESSING MACHINE
Filed July 21, 1954 — 3 Sheets-Sheet 3

INVENTOR.
JACK A. MARTELL
BY
ATTORNEYS

2,798,443

Patented July 9, 1957

2,798,443

MULTILAYER TABLET COMPRESSING MACHINE

Jack A. Martell, Westville, N. J., assignor to Smith, Kline & French Laboratories, Philadelphia, Pa., a corporation of Pennsylvania Application July 21, 1954, Serial No. 444,780

2 Claims. (Cl. 107—1)

This invention relates to a table compressing machine and, more particularly, to a machine adapted to compress a tablet composed of a plurality of layers of materials.

In the manufacture of tablets it is occasionally necessary to combine a plurality of materials in a tablet. When two or more of these materials are incompatible they must be kept separate and thus it is necessary to compress the materials into a tablet consisting of two or more layers of predetermined quantities of each of the incompatible materials. It is also desirable on some occasions to produce a tablet composed of a plurality of layers in order that sequential disintegration of the materials forming the tablet will occur. These materials may or may not be of compatible nature. Tablets formed with a plurality of layers of material of different shades and/or colors have the advantage of being readily identifiable as well as having a distinctive and desirable appearance.

It is the principal object of this invention to provide a machine which will produce tablets composed of a plurality of layers of dissimilar materials.

This and subsidiary objects of the invention will become apparent from the following description when read in conjunction with the accompanying drawings, in which.

Figure 1:
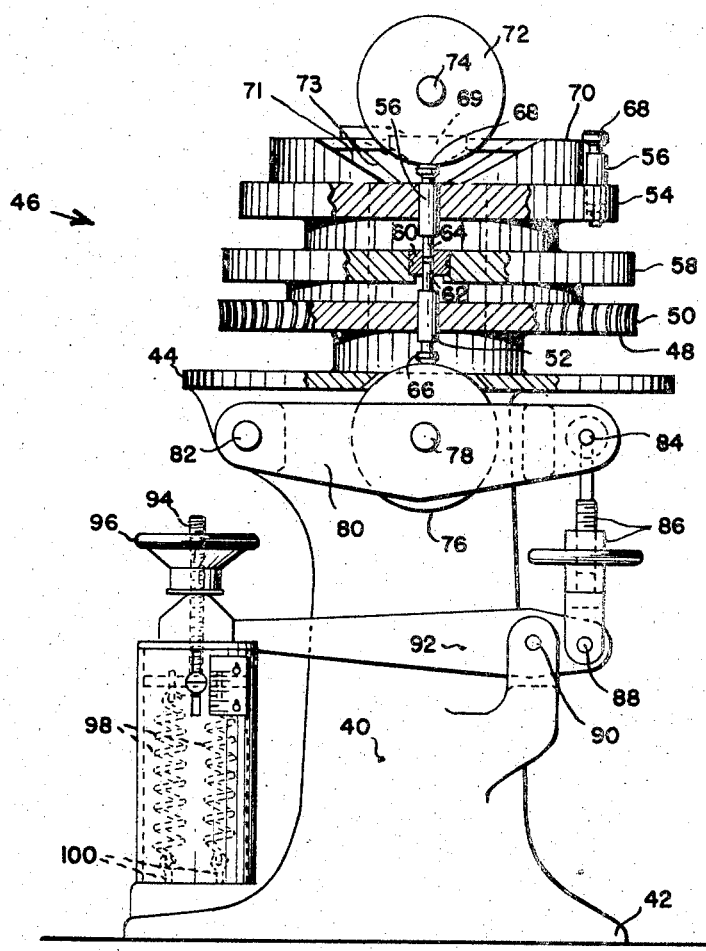
Figure 1 is a fragmentary elevation partly in section of the tablet compressing machine.

The machine includes a stand 40 having a base portion 42 adapted to rest upon a supporting surface. A fixed table 44 is supported on the upper portion of the stand 40. A rotating assembly, indicated generally at 46 in Figure 1, is positioned for rotation about a vertically extending axis above the fixed table 44.

The rotating assembly includes a lower disc 48 which supports a peripherally extending gear 50. The gear 50 is adapted to be engaged by a driven worm gear connected to a conventional driving motor through conventional drive means not shown in the drawings. The lower disc is provided with an annular array of bores within which there is mounted an annular array of punches 52. While only one punch 52 is shown in Figure 1, it will be evident that there is actually provided an annular array of punches extending completely around the lower disc 48. The rotating assembly also includes an upper disc 54 within which there is mounted an annular array of upper punches 56 only two of which are shown in Figure 1. The rotating assembly also includes an intermediate disc 58 which is shown in plan view in Figure 2 and which mounts an annular array of removable inserts 60. The inserts 60 are provided with vertically extending bores adapted to receive the reduced diameter upper end portions 62 of the lower punches 52 and the reduced diameter lower end portions 64 of the upper punches 60, pairs of upper and lower punches being axially aligned in their respective mounting discs 48 and 54.

The upper punches 56 are provided at their upper ends with heads 68 which are engaged and held upwardly by the upper surface of an upper fixed ring cam 70. The fixed ring cam 70 is mounted on the stand 40 by a vertically extending fixed support post rising upwardly within the rotating assembly 46. The fixed cam 70 is provided with a cut-away portion 71 which permits the upper punches rotating with the assembly 46 to ride downwardly under the force of gravity within the upper disc 54 in the region of an upper compression roll 72. The upper compression roll 72 is mounted on a fixed shaft 74 and upon engagement with the heads 68 of the upper punches 56 serves to drive the upper punches 56 downwardly to a predetermined downwardmost position as shown in Figure 1 with the lower end portion 64 of the depressed punch entered into the insert block 60 in the intermediate disc 58. Diametrically opposite to the cut-away portion 71 of the fixed cam 70 is a cut-away portion 73 within which is mounted a cam block 69. The cut-away portion 73 permits the upper punches 56 to ride downwardly and the cam block 69 depresses the punches to a predetermined position in the insert block 60.

The lower punches 52 are provided at their lower ends with heads 66 which are adapted to ride on the fixed table 44 and on various cam means positioned on the fixed table as will be hereinafter described and on a lower compression roller 76 positioned in vertical alignment with the upper compression roller 72 as shown in Figure 1. The upper ends of the lower punches 52 are always positioned within the bores in the blocks 60 and the lower cams and the roller 76 serve to raise the punches to predetermined positions within the blocks.

The lower compression roller 76 is mounted for rotation on a shaft 78 supported by an arm 80. One end of the arm 80 is pivoted at 82 to the stand 40. The other end of the arm 80 is pivotally connected at 84 to one end of an adjustable link 86. The other end of the adjustable link 86 is pivoted at 88 to one end of an arm 92 which is supported intermediate of its end on a fixed pivot 90. The opposite end of the arm 92 carries a threaded shaft 94 which is adjustably positioned with respect to the arm 92 by a threaded hand wheel 96. The lower end of the shaft 94 is attached to the upper end of a pair of springs 98. The lower ends of the springs 98 are affixed to the stand 40 by means of eye bolts 100. It will be evident that by adjusting the position of the hand wheel 96 on the threaded shaft 94 the compressive force exerted on a given quantity of powder between the ends of an aligning pair of upper and lower punches in one of the inserts 60 will be adjusted.

Figure 2:
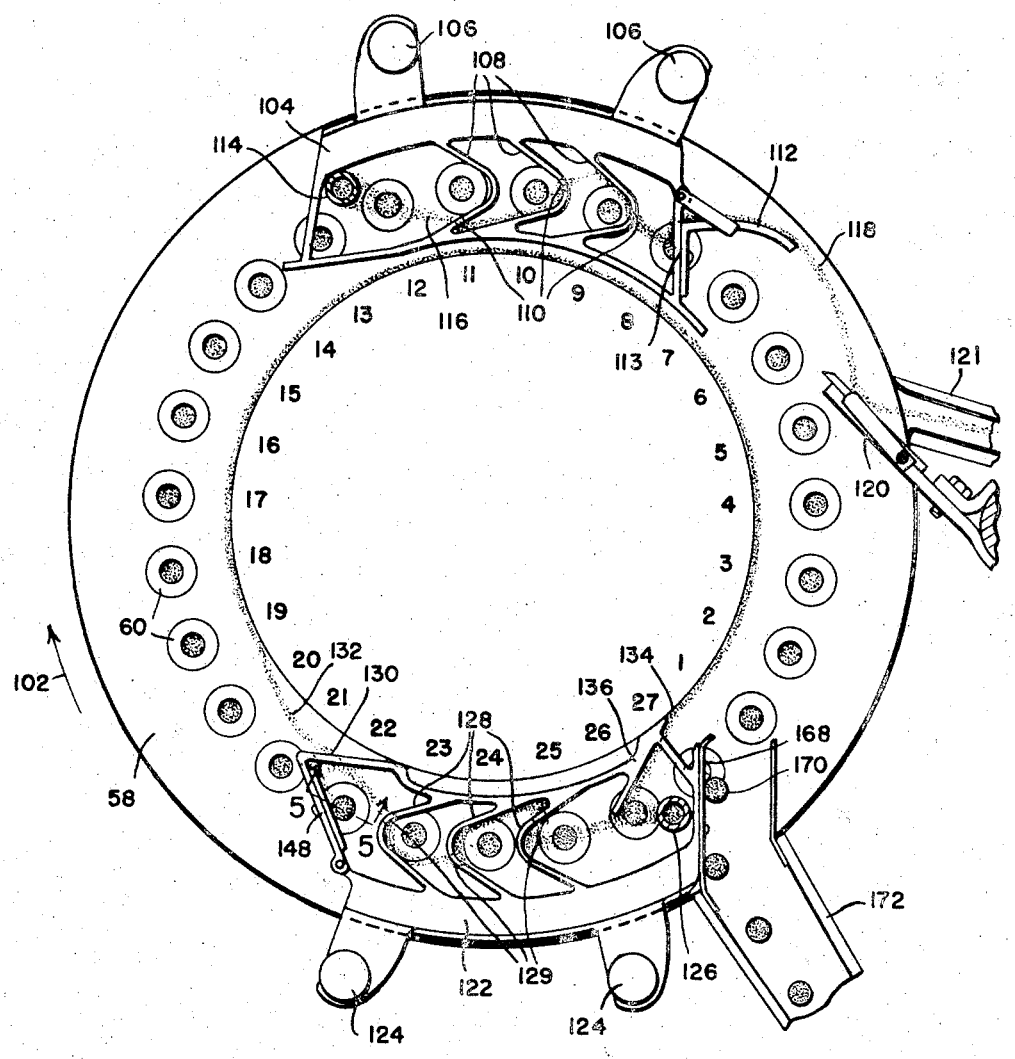
Figure 2 is a transverse section through the machine showing a fragmentary portion thereof in plan view.

The intermediate disc 58 rotates in the direction of the arrow 102 as shown in Figure 2. A fixed scraper assembly 104 is positioned over the disc 58 and is supported by means of brackets 106 affixed to the stand 40. The scraper assembly 104 includes three V-shaped scraper members 110. The scraper members 110 are in a form of vertically extending webs the lower edges of which bear against the top surface of the disc 58. The scrapers are provided at their lower edges with small cutout portions indicated at 110 in staggered arrangement. The scraper assembly also includes a deflector plate 112. Powder from which tablets are to be formed is admitted to the scraper assembly through a tube 114 from a suitable source. Powder leaving the lower end of the tube 114 is carried, as indicated at 116, by the rotating disc 58. The successive cutout passages through the scrapers 108 carry the powder along a staggered course while the bores in the inserts 60 of the rotating disc 58 pass under the scraper assembly and are filled with powder as will be hereinafter more fully described. The surplus powder carried by the rotating disc is deflected outwardly by the deflector blade 112 and follows a path 118 to a scraper 120 which deflects the surplus powder outwardly and delivers it to a chute 121 from which it is collected.

A similar scraper assembly 122 is positioned above the rotating disc 58 diametrically opposite of the scraper assembly 104. The scraper 122 is mounted on support brackets 124 affixed to the stand 40. Powder is admitted to the scraper assembly 122 through a tube 126 from a suitable source and is deflected to a staggered path by the V-shaped scraper blades 128 identical to the blades 108 described in connection with the scraper assembly 104. The surplus powder carried through cutouts 129 in the scraper blades 128 by the rotating disc passes through a cutout through the inward portion of the lower edge of a scraper 130 and follows an annular course around the innermost edge of the upper surface of the disc 58 as indicated at 132. The powder is returned to the scraper assembly as indicated at 134 and is deflected by means of a deflector 136 and the scraper blades 128 so as to pass over the bores in inserts in the disc 58.

Figure 3:
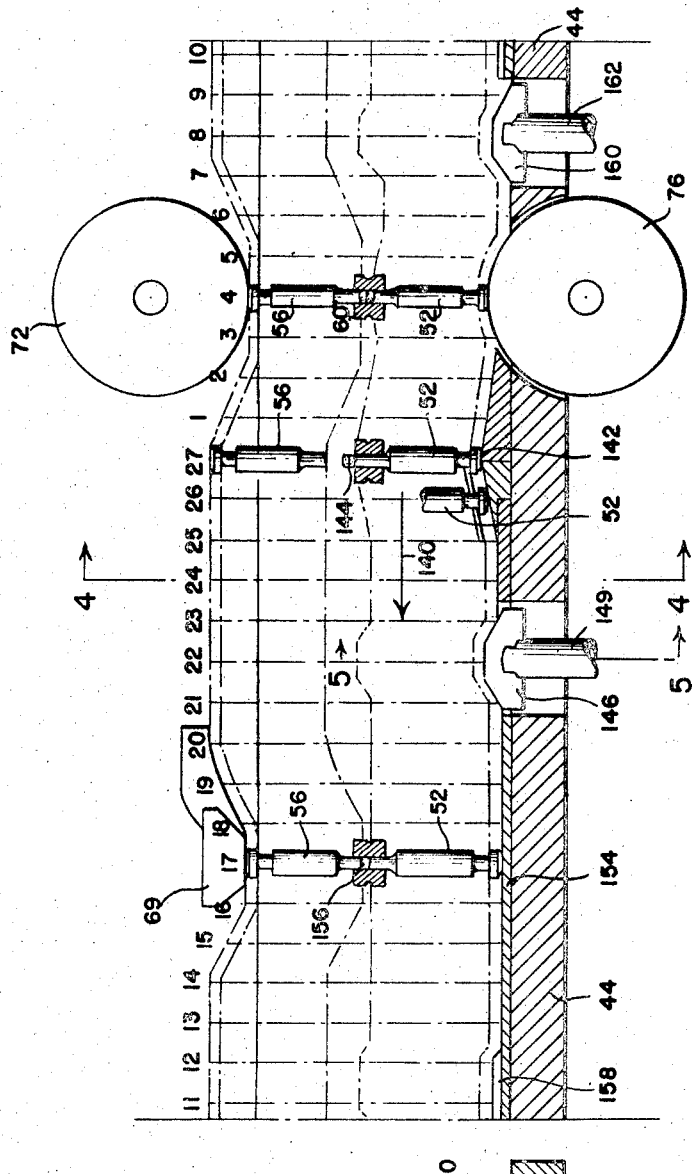
Figure 3 is a diagrammatic development of the parts of the machine and of their sequential operation.
Figure 4:
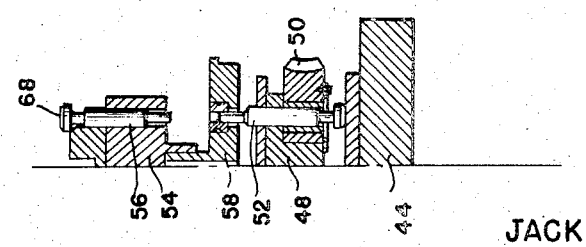
Figure 4 is a fragmentary vertical section through the portion of the machine indicated by the trace 4—4 in Figure 3.

Referring to Figures 2 and 3, the annular array of bores in the inserts 60 are arbitrarily numbered sequentially from 1 to 27. In the diagram of Figure 3 this sequence of numerals is shown in linear development in conjunction with the relative positions of the various cams for actuating the rotating array of punches. In the diagram of Figure 3 the rotation of the rotating assembly is in the direction indicated by the arrow 140.

Beginning with station 27, the lower punch 52 is raised in an elevated position by contact of the head of the punch with a fixed cam 142 mounted on the table 44, and the upper surface of the lower punch is flush with the upper surface of the disc 58. In this station the upper punch is in an elevated position clear of the disc 58 and the scraper assemblies positioned thereon. The relation of the two punches to the insert 60 is indicated generally at 144 in Figure 3. As the rotating assembly rotates, the lower punch 52 moves downwardly off of the cam 142 and passes through stations 25, 24 and 23 below the scraper assembly wherein the space within the bore in the insert is filled with powder above the upper end of the lower punch. When the lower punch is in station 22, it is elevated by a fixed cam 146 and the final scraper 148 of the scraper assembly 122 scrapes away all surplus powder. In this position the amount of the first powder to be included in the final tablet is determined. This amount is determined by the setting of the cam 146.

Figure 5:
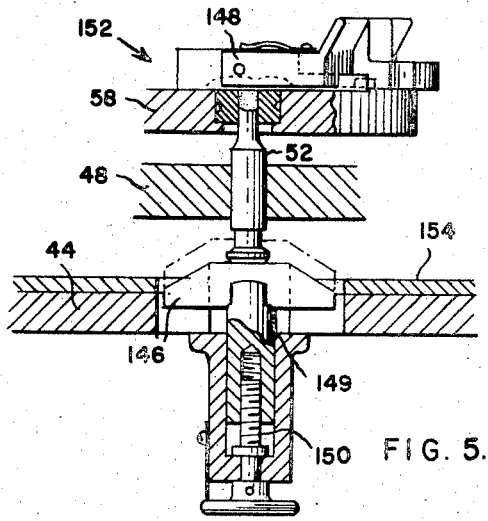
Figure 5 is a fragmentary vertical section through the portion of the machine indicated by the trace 5—5 in Figure 3.

Referring to Figure 5 there is shown in greater detail the cam 146 positioned in a cutout in the fixed table 44 by an adjustable support post 149. The adjustable support post 149 is positioned by means of a threaded bolt 150. It will be evident that, by rotation of the bolt 150, the elevation of the support 149 and of the cam 146 can be adjusted, and thus the quantity of powder carried in the bores of the inserts leaving the scraper assembly 122 can be adjusted. The relative positions of the lower punch and the upper surface of the disc 58 are indicated generally at 152 in Figure 5.

Conditioned rotation of the rotating assembly carries the lower punch through stations 21 and 22 in which the lower punch drops down from the cam 146 onto a plate 154 affixed to the upper surface of the table 44. At station 17, there is provided the fixed cam 69 which serves to depress the upper punch 56 and partially compact the first powder charge within the insert 60 between the ends of the punches. This condition is indicated generally at 156 in Figure 3. Continued rotation through stations 16—13 causes the upper punch to be raised by the action of the cam 70 and carries the insert 60 to the scraper assembly 104. At station 12 the lower cam is raised by a fixed cam block 158 mounted on the plate 154. The cam 158 establishes the position of the lower punch as it passes through stations 12—9 under the scraper assembly 104. It will be evident that the height of the block 158 will determine the amount of space provided above the already partially compacted first powder charge in which the second powder may be deposited by the scraper assembly 104. The final metering of this powder charge is accomplished at station 8. In this station the lower punch rides over a cam 160 which is mounted on a support member 162. The cam 160 and the support member 162 are part of an arrangement substantially identical to that described in connection with the cam 146 and shown in Figure 5. The cam 160 raises the lower punch, the first partially compacted powder charge and the second powder charge to a predetermined degree, thus finally establishing the quantity of the second powder charge which is retained in the insert 60. The powder extending above the surface of the intermediate disc 58 is scraped away by the scraper blade 113. This arrangement is substantially identical with the arrangement shown in Figure 5 except that the punch 52 will be in a lower position and two separate charges of powder will exist in the insert.

The rotating assembly then carries the punches through stations 6 to 4 wherein the upper and lower punches are in position between the compression rollers 72 and 76. In this position the two metered charges of powder are compressed to produce the final tablet.

Continued rotation of the rotating assembly carries the punches clear of the compression rollers whereupon the upper punch is raised above the disc 58 and the lower punch rides upwardly on the cam 142 until the upper surface of the lower punch is flush with the upper surface of the disc 58 and the compressed tablet is carried from the end of the punch by a scraper blade 168 and delivered to a discharge chute 170.

From the foregoing it will be evident that the apparatus described is capable of producing a tablet having two layers of material each of which comprises a metered quantity of powder which is individually supplied to the machine. It will also be evident that by adjusting the positions of cams 146 and 160 the relative quantities of the two materials of which the tablet is formed may be adjusted. It will be further evident that the apparatus described may be modified by the provision of additional scraper assemblies and cams in accordance with the foregoing teachings to produce tablets having more than two layers of material.

What is claimed is:

1. A tablet compressing machine comprising moving support means, means providing an array of cavities in said support means, a pair of opposed punches vertically axially aligned with each of said cavities, the lower punch of each of said pairs of punches closing the bottom of its associated cavity and the upper punch of each of said pairs of punches being positioned for entrance into the top of its associated cavity, means mounting the punches of said pairs of punches for movement with said support means and for movement vertically axially of their associated cavities, and means for selectively vertically axially moving the punches of each of said pairs of punches, said last mentioned means including successive means for positioning the punches of a pair of punches to provide an open mold cavity of predetermined size for the receipt of a predetermined quantity of a first material, means for positioning the punches of said pair for compressing the first material in a lowermost position in said cavity between said punches, means for positioning the punches of said pair to provide an open mold cavity of a predetermined size above the compressed first material for the receipt of a predetermined quantity of a second material, means for positioning the punches of said pair to compress the two materials into a single multilayer tablet, and means for positioning the punches of said pair to effect removal of the tablet from the cavity.

2. A tablet compressing machine comprising moving support means, means providing an array of cavities in said support means, a pair of opposed punches vertically axially aligned with each of said cavities, the lower punch of each of said pairs of punches closing the bottom of its associated cavity and the upper punch of each of said pairs of punches being positioned for entrance into the top of its associated cavity, means mounting the punches of said pairs of punches for movement with said support means and for movement vertically axially of their associated cavities, and means for selectively vertically axially moving the punches of each of said pairs of punches, said last mentioned means including successive means for positioning the punches of a pair of punches to provide an open mold cavity of predetermined size for metering a predetermined quantity of a first material, means for lowering both punches of said pair and for compressing the first material in a lowermost position in said cavity between said punches, means for raising both of said punches to provide an open mold cavity of a predetermined size above the compressed first material for metering a predetermined quantity of a second material, means for lowering the upper punch and for urging the lower punch upwardly to compress the two materials into a single multilayer tablet, and means raising said punches to effect removal of the tablet from the cavity.

References Cited in the file of this patent

UNITED STATES PATENTS

| 701,438 | Whyte | June 3, 1902 |
| 785,402 | Buckley | Mar. 21, 1905 |
| 1,248,571 | Stokes | Dec. 4, 1917 |
| 2,043,085 | Westin et al. | June 2, 1936 |
| 2,043,086 | Westin et al. | June 2, 1936 |
| 2,166,192 | Whittemore | July 18, 1939 |
| 2,700,938 | Wolff et al. | Feb. 1, 1955 |

FOREIGN PATENTS

| 204,824 | Germany | Dec. 13, 1908 |